(12) United States Patent
Herr

(10) Patent No.: US 9,873,191 B2
(45) Date of Patent: *Jan. 23, 2018

(54) POWER DRILL

(71) Applicant: ROBERT BOSCH GMBH, Stuttgart (DE)

(72) Inventor: Tobias Herr, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 766 days.

This patent is subject to a terminal disclaimer.

(21) Appl. No.: 14/228,992

(22) Filed: Mar. 28, 2014

(65) Prior Publication Data

US 2014/0209339 A1    Jul. 31, 2014

Related U.S. Application Data

(63) Continuation of application No. 12/951,731, filed on Nov. 22, 2010, now Pat. No. 8,720,598.

(30) Foreign Application Priority Data

Dec. 18, 2009   (DE) .................... 10 2009 054 925

(51) Int. Cl.
*B25F 5/00* (2006.01)
*B25D 16/00* (2006.01)
*B25B 23/14* (2006.01)

(52) U.S. Cl.
CPC .......... *B25D 16/006* (2013.01); *B25B 23/141* (2013.01); *B23B 2260/0445* (2013.01);
(Continued)

(58) Field of Classification Search
CPC ................. B25D 16/00; B25D 16/006; B25D 2216/023; B25D 2250/165; B25B 23/141
(Continued)

(56) References Cited

U.S. PATENT DOCUMENTS 5,343,961 A * 9/1994 Ichikawa ................ B25B 21/00
                                                      173/178
5,531,278 A * 7/1996 Lin ........................ B25D 16/00
                                                       173/13

(Continued)

FOREIGN PATENT DOCUMENTS

EP      2184138      5/2010

*Primary Examiner* — Andrew M Tecco
(74) *Attorney, Agent, or Firm* — Norton Rose Fulbright US LLP; Gerard Messina

(57) ABSTRACT

The invention relates to a power drill, having a tool-clamping device that is coupled to a drive motor via a drive shaft and a torque clutch equipped with a transmission element. The torque clutch has a clutch-adjusting ring that cooperates at least indirectly with at least one clamping element that exerts a prestressing force on the transmission element. An end of the drive shaft oriented toward the tool-clamping device is guided in a bearing that axially fixes the drive shaft in a drilling or screwdriving position and axially releases the drive shaft in an impact drilling position. The bearing cooperates with a bearing holder, which moves the bearing axially via a user-actuatable actuating element. According to the invention, the actuating element is coupled to an adjusting element that axially fixes the transmission element and axially releases the bearing in the impact drilling position and axially releases the transmission element and axially fixes the bearing in the drilling or screwdriving position.

25 Claims, 6 Drawing Sheets

(52) U.S. Cl.
CPC ............ *B25D 2216/0023* (2013.01); *B25D 2216/0038* (2013.01); *B25D 2250/165* (2013.01)

(58) Field of Classification Search
USPC ............ 173/178, 48, 47, 170, 216, 217
See application file for complete search history.

(56) References Cited

U.S. PATENT DOCUMENTS

| | | | |
|---|---|---|---|
| 6,745,883 B2 * | 6/2004 | Eto ................ | B25B 23/14 173/178 |
| 7,168,503 B1 * | 1/2007 | Teng ............... | B25B 21/00 173/178 |
| 8,251,158 B2 * | 8/2012 | Tomayko .......... | B23B 45/008 173/11 |
| 8,720,598 B2 * | 5/2014 | Herr ............... | B25B 23/141 173/178 |
| 2009/0126954 A1 * | 5/2009 | Trautner .......... | B23B 45/008 173/48 |
| 2010/0163261 A1 * | 7/2010 | Tomayko .......... | B23B 45/008 173/47 |
| 2011/0147024 A1 * | 6/2011 | Herr ............... | B25B 23/141 173/48 |

* cited by examiner

POWER DRILL

CROSS-REFERENCE TO RELATED APPLICATION

This application is based on German Patent Application 10 2009 054 925.0 filed on Dec. 18, 2009.

BACKGROUND OF THE INVENTION

Field of the Invention

The invention relates to a power drill.

Description of the Prior Art

Hand-held power drills have a drive motor in the form of an electric motor, which usually uses a multi-stage planetary gear set to drive a spindle that has a tool holder for accommodating various tools such as drill bits, screwdriver bits, or the like. To activate an impact drilling function on a power drill, it is known to provide an actuating element embodied in the form of an adjusting ring. During impact drilling, the impact mechanism is activated and the clutch function (via which it is possible to set or limit a torque to be transmitted during screwdriving or drilling) is deactivated. In this case, the impact mechanism is activated by means of a cam ring so that the axial bearing of the drive shaft oriented toward the tool holder is axially released. In addition, the clutch function is deactivated in that locking pins are moved axially into a locking wheel, radially immobilizing the locking wheel and preventing it from disengaging.

OBJECT AND SUMMARY OF THE INVENTION

Based on the above-described prior art, the object of the invention is to modify a power drill so that it enables an inexpensive clutch locking, and at the same time, the overall axial length of the power drill should be as compact as possible and it should be possible to achieve a design that is not tolerance sensitive and at the same time, is easy to use.

According to the invention, an adjusting element is coupled to the actuating element, which adjusting element, in an impact drilling position, axially fixes the transmission element and axially releases the bearing element and in the drilling or screwdriving position, axially releases the transmission element and axially fixes the bearing element. In other words, this means that a single component, the so-called adjusting element, simultaneously fulfills a plurality of functions with regard to the disengagement and engagement of the clutch device and the axial movement of the axial bearing on the drive shaft. On the one hand, this makes it possible for example to eliminate the locking pins by comparison with the prior art and on the other hand, enables a particularly compact design.

In an implementation of the invention that is advantageous from a structural standpoint, the adjusting element has at least one spacer element on the side oriented toward the transmission element; in the drilling or screwdriving position, the at least one spacer element is supported against an element affixed to the housing, thus holding the bearing holder in its position that locks the axial bearing of the drive shaft and in the impact drilling position, the at least one spacer element is not in contact with the element affixed to the housing so that the bearing holder moves the axial bearing into its position that releases the drive shaft.

To achieve savings on additional parts and thus to achieve an inexpensive manufacture, it is particularly preferable if the element affixed to the housing is a transmission housing. Since the transmission housing must also be embodied as relatively stable, it is consequently also suitable for transmitting axial forces via the adjusting element.

To enable a uniform introduction of force that permits particularly powerful axial forces to be transmitted and on the other hand, to enable a production-oriented manufacture of the adjusting element, a particularly advantageous embodiment is provided with a plurality of spacer elements, which are situated at equidistant angular intervals from one another, the adjusting element is composed of metal or plastic, and the spacer elements are formed onto the adjusting element and are of one piece with it.

A compact design of the power drill and a production-oriented assembly can also be achieved if the actuating element is embodied in the form of an adjusting ring, at least one first recess is embodied on the inner surface of the adjusting ring, and the adjusting element is radially encompassed by the adjusting ring and has at least one projection that engages in a form-locking fashion in the at least one recess of the adjusting ring.

A production-oriented assembly in which the components can also have a particularly compact form is achieved if the adjusting element is embodied as annular and if the adjusting element has at least one second recess on its inner circumference.

It is particularly preferable here that the at least one second recess cooperates with a stationary undercut, which, after the adjusting element is rotated relative to the undercut, axially secures the adjusting element. This prevents the adjusting ring from being able to continue moving in the axial direction of the tool-clamping device, past its axial position that releases the transmission element.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
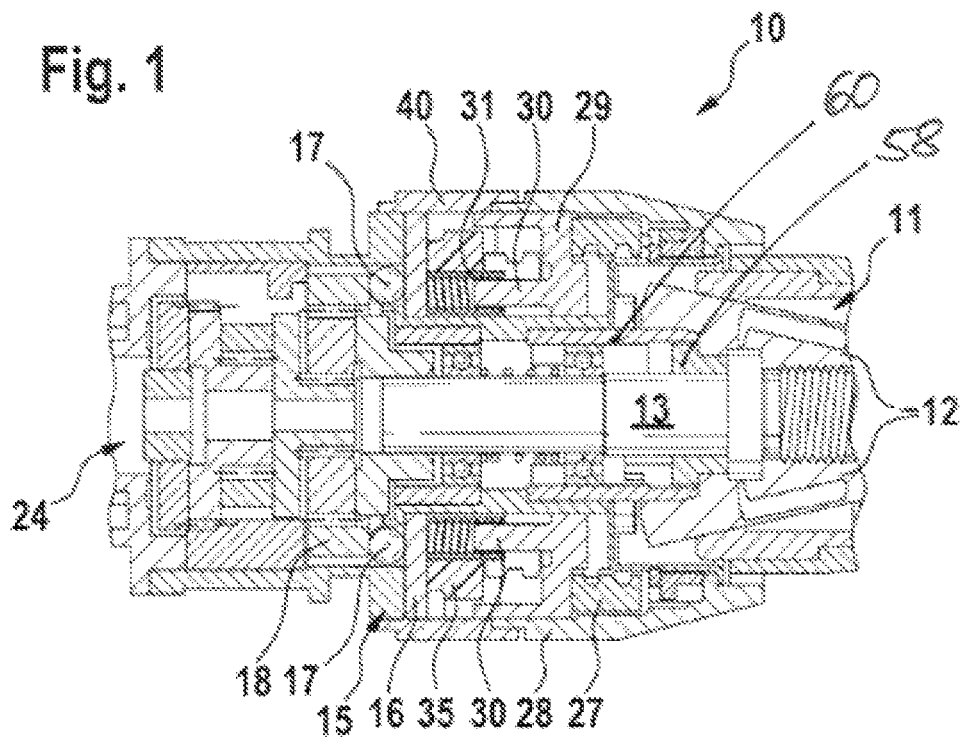
FIG. 1 is a longitudinal section through a power drill according to the invention, in its axially frontal region.

FIG. 1 shows a detail of a power drill 10 according to the invention. In this case, the power drill 10 is in particular a cordless drill that has an impact mechanism for an impact drilling function and has a drilling and screwdriving function.

At the axial front end of the power drill 10 the drawing shows a tool-clamping device 11 equipped with a plurality of clamping jaws 12, in particular three of them, situated at equidistant angular intervals from one another. The tool-clamping device 11 is fastened to one end of a drive shaft 13 embodied in the form of a spindle shaft. The drive shaft 13 cooperates with a torque clutch 15, which is equipped with a transmission element embodied in the form of a pressure plate 16 for a torque that is to be transmitted. On the side oriented away from the tool-clamping device 11, the pressure plate 16 cooperates with a plurality of balls 17, in particular situated at equidistant angular intervals from one another, which rest against an end surface of a locking wheel 18.

Figure 5:
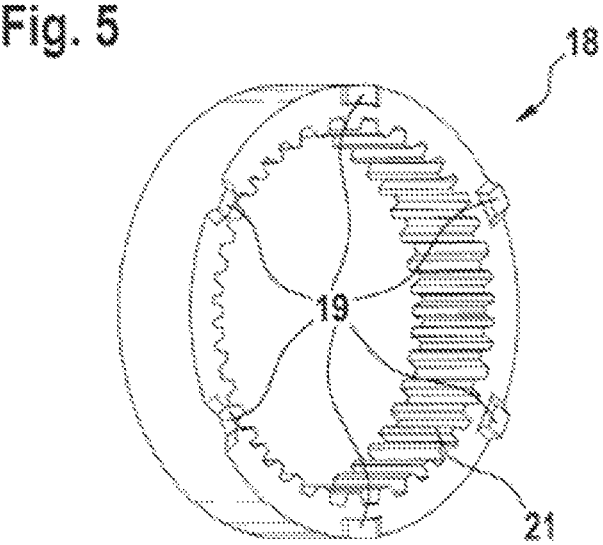
FIG. 5 is a perspective view of a locking wheel.

As is particularly clear from FIG. 5, on its end surface oriented toward the balls 17, the locking wheel 18 has a plurality of protrusions 19 that correspond in number to the number of balls 17. The protrusions 19 function as stops for the balls 17 so that a torque introduced via the locking wheel 18 can be transmitted via the protrusions 19 and balls 17 to the pressure plate 16. On the inner wall of the locking wheel 18, the drawing also shows an internal gearing 21 that cooperates with an output gear of a multistage planetary gear set 24. The input shaft of the planetary gear set 24, not shown in detail in the drawings, is connected to the drive unit of the power drill 10, which is embodied in the form of an electric motor.

Figure 8:
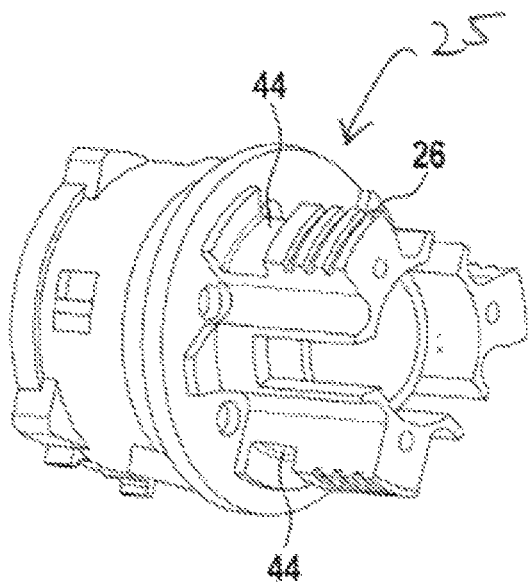
FIG. 8 is a perspective depiction of a transmission housing.

The planetary gear set 24 is contained in a transmission housing 25, which housing is separately depicted in FIG. 8 and on the side oriented toward the tool-clamping device 11, has an external thread 26 on which an adjusting nut 27 is supported in rotary fashion (FIG. 1). The adjusting nut 27 is coupled to a first actuating ring 28 that is used to establish the torque that can be transmitted via the torque clutch 15 in the screwdriving or drilling mode. For this purpose, the end surface of the adjusting nut 27 oriented away from the tool-clamping device 11 cooperates with an axially movable spring holder 29, which has pin-like extensions 30. The extensions 30 serve to guide a plurality of compression springs 31 that are arranged around the circumference, are preferably situated at equidistant angular intervals from one another, function as clamping elements, and each contact the pressure plate 16 with their respective end surface oriented away from the tool-clamping device 11.

The torque clutch 15 functions in such a way that an actuation of the first adjusting ring 28 and therefore also of the adjusting nut 27 in the direction of the pressure plate 16 increases the axial force exerted on the pressure plate 16 via the compression springs 31, thus also increasing the amount of torque that the locking wheel 18 is able to transmit via the protrusions 19 and balls 17. When the torque defined by the compression springs 31 is exceeded, the balls 17 roll past the protrusions 19 of the locking wheel 18, causing a slippage to occur between the locking wheel 18 and the pressure plate 16. As a result, the pressure plate 16 moves axially out of the way while the locking wheel 18 rotates and the spindle or drive shaft 13 remains stationary.

Figure 9:
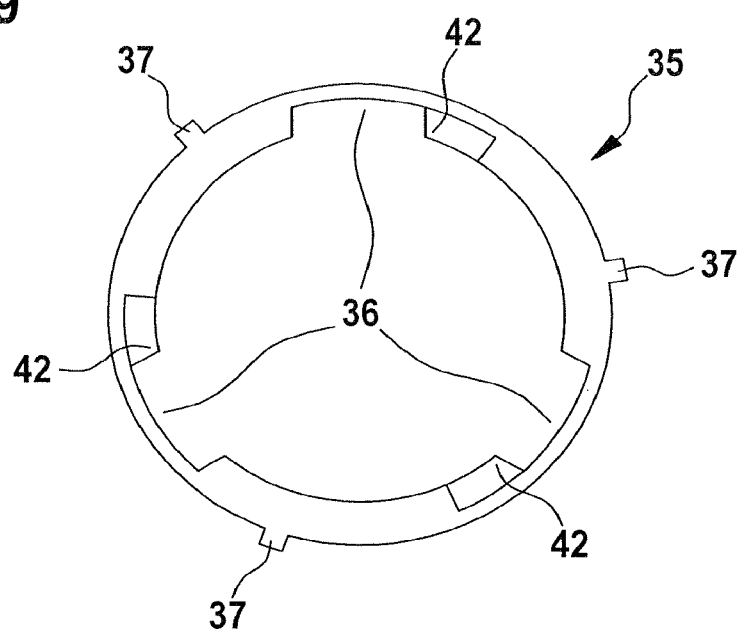
FIG. 9 is a top view of a cam ring.
Figure 10:
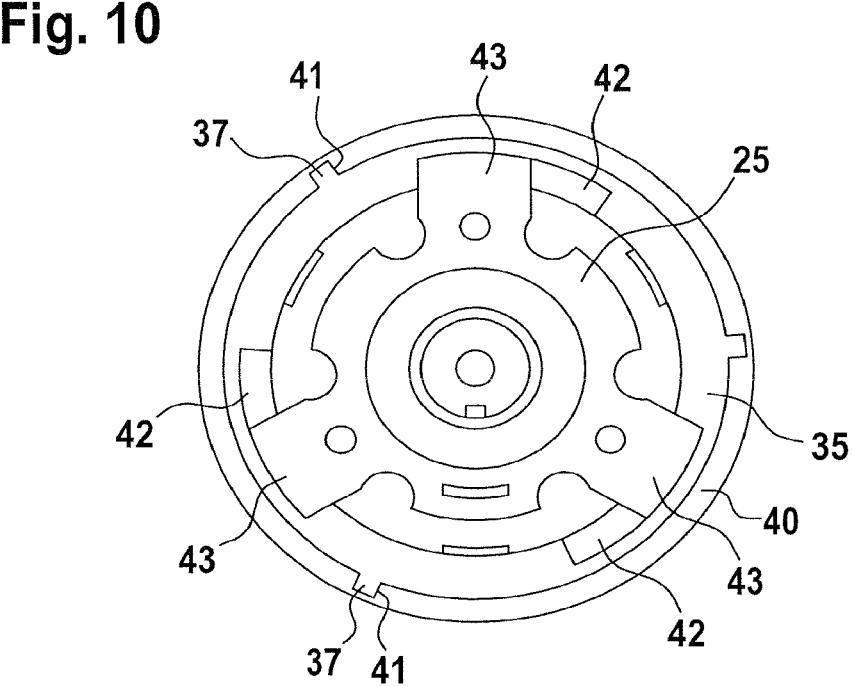
FIG. 10 is a view of the power drill during installation of the cam ring.

In the immediate vicinity of the pressure plate 16, a cam ring 35 is situated on the stationary transmission housing 25. As depicted the most clearly in FIG. 9, the inner wall of the cam ring 35, which is in particular composed of metal or plastic, has for example three recesses 36 situated at equidistant angular intervals from one another. In addition, the outer circumference of the cam ring 35 also has three projections 37 formed onto and of one piece with it, which are situated at equidistant angular intervals from one another. When FIGS. 9 and 10 are considered together, it is also apparent that the cam ring 35 is encompassed by a second adjusting ring 40 that functions as an actuating element and has corresponding recesses 41 that serve to accommodate the projections 37 of the cam ring 35 in a form-locking fashion. It is also apparent from FIGS. 9 and 10 that the recesses 36 each have a respective ramp 42 at one end, which converts the rotary motion of the cam ring 35 into an axial motion of the drive shaft 13.

FIG. 10 shows that the transmission housing 25 has three threaded struts 43 situated at equidistant angular intervals from one another, whose widths permit them to be accommodated with a small amount of play in the recesses 36 of the cam ring 35. It is also clear from FIG. 8 that the transmission housing 25 is provided with undercuts 44 that cooperate with the cam ring 35.

Figure 11:
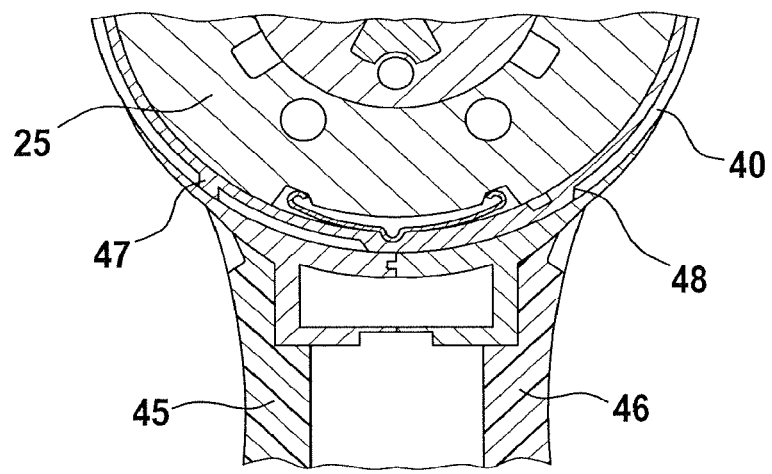
FIG. 11 is a partial section through the power drill according to FIG. 1 in the region of the transmission housing and cam ring.

To mount the cam ring 35 onto the transmission housing 25, the cam ring 35 is initially placed with its recesses 36 congruent with the threaded struts 43 of the transmission housing 25. Then the cam ring 35 can be slid onto the transmission housing 25 in the direction toward the pressure plate 16 until the recesses 36 come into the vicinity of the undercuts 44. Then the cam ring 35 is rotated in the direction toward the ramps 42 so that the cam ring 35 is then axially secured in the direction toward the tool-clamping device 11. FIG. 11 also shows that the housing shells 45, 46 of the power drill 10 are provided with stops 47 and 48 that limit the radial adjusting range of the second adjusting ring 40 once it is mounted in place. Since the second adjusting ring 40 is connected to the cam ring 35, it is thus possible to prevent the cam ring 35 from being moved back into its assembly position after assembly of the power drill 10.

The drive shaft 13 of the power drill 10 is guided in an axial bearing 50 at its end oriented toward the tool-clamping device 11. The axial bearing 50 is axially fixed during the drilling or screwdriving operation of the power drill 10 and axially movable during impact drilling so that an impact mechanism, which is neither shown nor described in detail here, of the power drill 10 can cooperate with the drive shaft 13, thereby axially moving the latter. The axial mobility of the axial bearing 50 is enabled by means of a bearing element embodied in the form of a bearing holder 51. For example, the bearing holder 51 has three supporting feet 52 that are situated at equidistant angular intervals from one another. The strut-like supporting feet 52 extend to the cam ring 35 and are operatively connected to it. The supporting feet 52 here are situated in recesses between the threaded struts 43 of the transmission housing 25 (see FIG. 2). It is also clear from FIG. 2 that the cam ring 35 has a plurality of spacer elements 53, which are situated on the end surface oriented toward the pressure plate 16 and are of one piece with the cam ring 35. In the screwdriving or drilling position, the spacer elements 53 protrude into the recess 54 of the pressure plate 16 and are supported axially against the transmission housing 25 that functions as a counterpart element affixed to the housing. As a result, the forces exerted by the user are transmitted from the spindle or drive shaft 13 to the transmission housing 25 via the axial bearing 50 and the cam ring 35 with the spacer elements 53. In the impact drilling mode, the user does not exert any force on the transmission housing 25 via the cam ring 35, but instead, the cam ring 35 with its spacer elements 53 functions as an axial locking element for the pressure plate 16.

Figure 2:
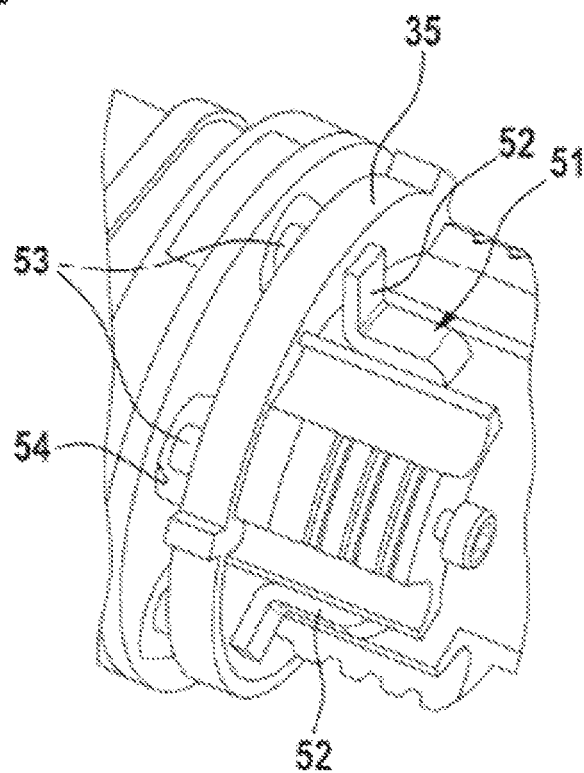
FIG. 2 is a perspective view of the power drill according to FIG. 1, in the region of a cam ring, with various parts not depicted for the sake of clarity.
Figure 3:
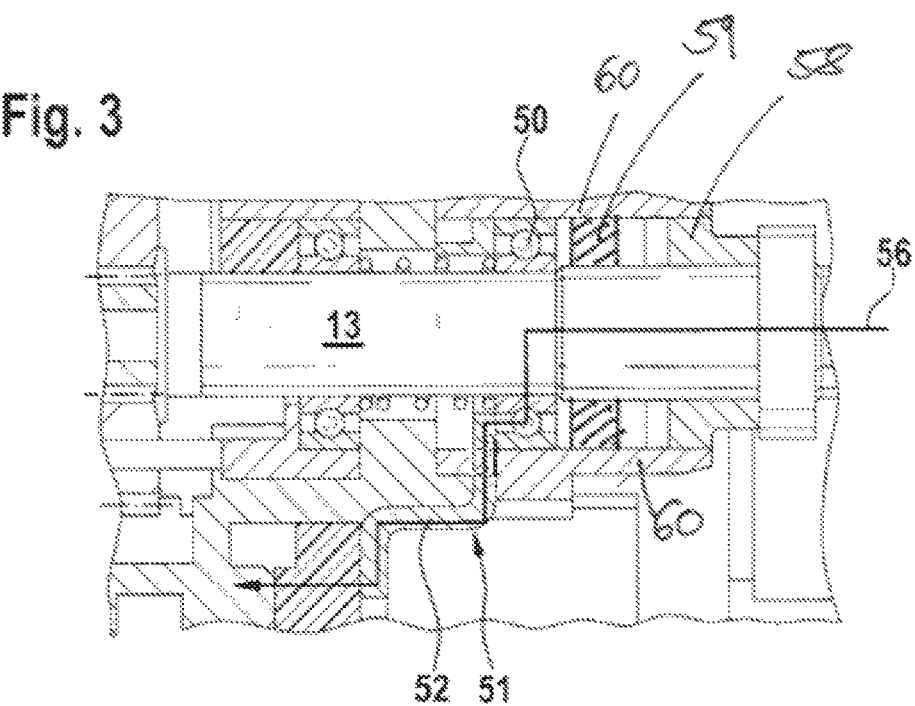
FIG. 3 is a longitudinal section through the power drill according to FIG. 1 to illustrate the flow of force in the drilling or screwdriving mode.
Figure 4:
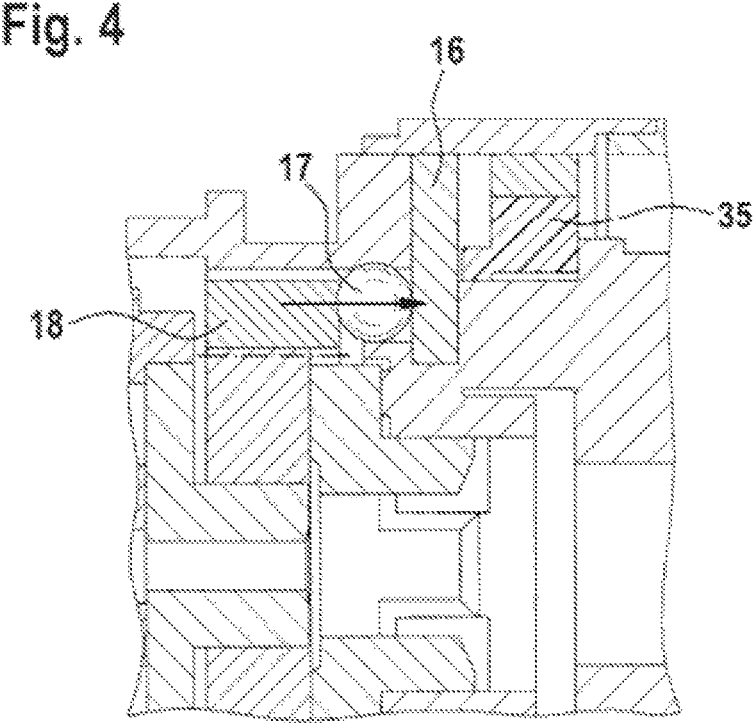
FIG. 4 is a longitudinal section through the region of the torque clutch in a detail from FIG. 1.
Figure 7:
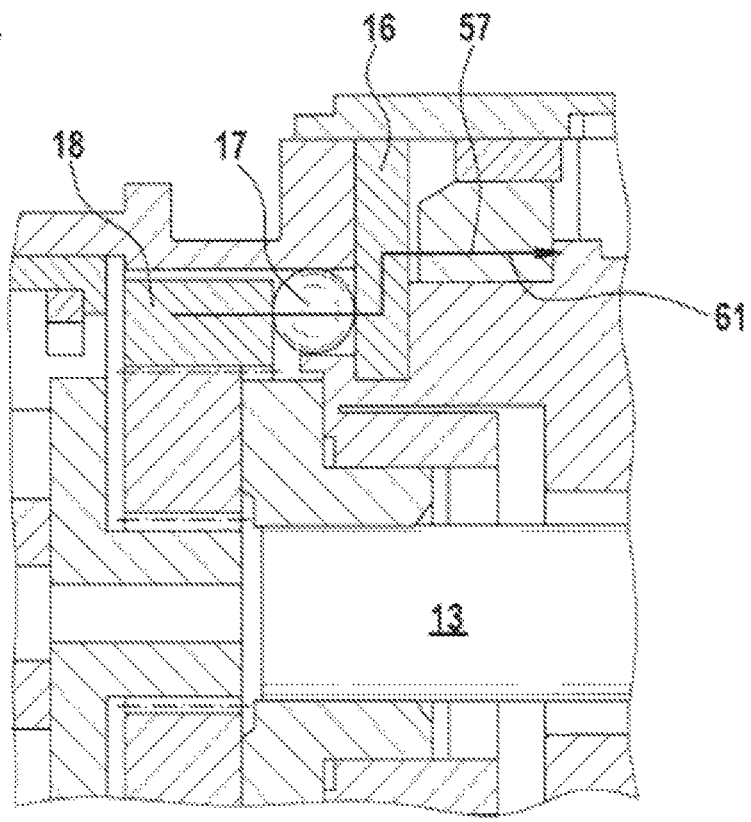
FIG. 7 is another longitudinal section through the clutch device to illustrate the flow of force.

FIGS. 2, 3, and 4 show the drilling or screwdriving position of the power drill 10. In this case, the pressure plate 16 is not axially secured by the cam ring 35. Instead, the pressure plate 16 is axially held between the compression springs 31 and the balls 17 or transmission housing 25. Furthermore, the cam ring 35 is axially secured by the transmission housing 25. In accordance with the arrow 56 describing the flow of force in FIG. 3, a compressive force exerted by the user is introduced into the transmission housing 25 via the drive shaft 13, the axial bearing 50, the bearing holder 51, and the cam ring 35. In the drilling position, the torque clutch 15 is locked by the spring holder 29 and the adjusting nut 27, i.e. the pressure plate 16 is axially secured. The torque introduced by the locking wheel 18 is introduced into the pressure plate 16 as axial force (see arrow 57 in FIG. 7) via the balls 17 and introduced into the transmission housing 25 via the spring holder 29 and the adjusting nut 27. In the screwdriving position of the power drill 10, the introduced torque is introduced into the pressure plate 16 as an axial force via the balls 17. In this case, the pressure plate 16 can move axially out of the way in the direction toward the tool-clamping device 11 so that if the torque defined by the adjusting nut 27 is exceeded, the balls 17 can travel over the protrusions 19 of the locking wheel 18. As a result, the locking wheel 18 rotates while the spindle or drive shaft 13 remains stationary.

Figure 6:
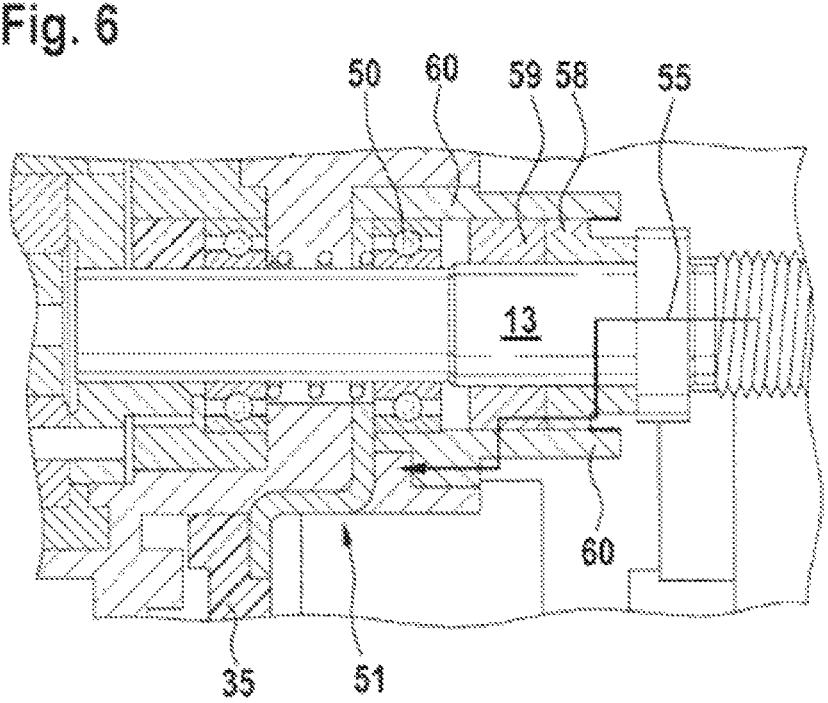
FIG. 6 is a partial longitudinal section through the power drill according to FIG. 1 to illustrate the flow of force in the impact drilling position.

FIG. 6 shows the impact drilling position of the power drill 10. Here, the bearing holder 51 and therefore also the axial bearing 50 is axially released by the cam ring 35 via the recesses 54. The pressing force exerted by the user is introduced into the transmission housing 25 in accordance with the arrow 55 via the drive shaft 13, a locking wheel 58 affixed to the drive shaft 13, a locking wheel 59 affixed to a locking sleeve 60, and the locking sleeve 60. In the impact drilling position of the power drill 10, the torque clutch 15 is locked by means of the cam ring 35, i.e. the pressure plate 16 is axially secured. As depicted by the arrow 61 in FIG. 7, the torque introduced by the locking wheel 18 is then introduced into the pressure plate 16 as an axial force via the balls 17 and introduced into the transmission housing 25 via the cam ring 35.

The power drill 10 described thus far can be modified in a multitude of ways. In particular, the structural embodiment of the connections between the individual components is not limited to the connections depicted in the course of the above description. It is thus conceivable, for example, for the cam ring 35 to be connected to the second adjusting ring 40 not by means of form-locking engagement but rather by means of frictional, nonpositive engagement.

The foregoing relates to preferred exemplary embodiments of the invention, it being understood that other variants and embodiments thereof are possible within the spirit and scope of the invention, the latter being defined by the appended claims.

The invention claimed is:

1. A power drill, having
a tool-clamping device that is coupled to a drive motor via a drive shaft;
a torque clutch comprising:
a transmission element; and
a clutch-adjusting ring that cooperates at least indirectly with at least one clamping element that exerts a prestressing force on the transmission element;
a drive shaft being guided in a bearing, the drive shaft being axially fixed in a drilling or screwdriving position and being axially released in an impact drilling position; and
a user-actuatable actuating element which is embodied in one piece with or coupled to an adjusting element, wherein the adjusting element has at least one axially projecting spacer element on a side thereof oriented toward the transmission element, the spacer element being supported against an element affixed to a housing such that the transmission element is axially released and the drive shaft is axially fixed in the drilling or screwdriving position, and the spacer element being supported against the transmission element such that the transmission element is axially fixed and the drive shaft is axially released in the impact drilling mode.

2. The power drill as defined in claim 1, wherein the bearing cooperates with a bearing holder which moves the bearing axially via the user-actuatable actuating element.

3. The power drill as defined in claim 2, wherein in the impact drilling position the bearing holder is supported against the adjusting element such that the drive shaft is axially fixed, and in the drilling or screwdriving position the bearing holder at least partly enters a recess of the adjusting element such that the drive shaft is axially released.

4. The power drill as defined in claim 2, wherein the bearing holder has at least one strut-like supporting element.

5. The power drill as defined in claim 4, wherein the at least one strut-like supporting element is accommodated in a recess on a transmission housing.

6. The power drill as defined in claim 2, wherein the adjusting element has at least one spacer element on a side thereof oriented toward the transmission element, which in the drilling or screwdriving position, the at least one spacer element is supported against an element affixed to a housing, thus holding the bearing holder in a position that locks the axial bearing of the drive shaft, and which in the impact drilling position, the at least one spacer element does not contact the element affixed to the housing so that the bearing holder moves the axial bearing into a position that releases the drive shaft.

7. The power drill as defined in claim 1, wherein the bearing is configured to guide an end of the drive shaft that is oriented toward the tool-clamping device.

8. The power drill as defined in claim 1, wherein the transmission element is embodied as a pressure plate.

9. The power drill as defined in claim 1, wherein the adjusting element is embodied as a cam ring.

10. The power drill as defined in claim 1, wherein the element affixed to the housing is a transmission housing.

11. The power drill as defined in claim 1, wherein the at least one spacer element is supported against the transmission element such that the spacer element acts as an axial locking element for the transmission element in the impact drilling position.

12. The power drill as defined in claim 1, wherein the at least one spacer element protrudes into a recess of the transmission element such that the spacer element is supported against an element affixed to a housing in the screwdriving position.

13. The power drill as defined in claim 1, wherein the adjusting element has at least one recess on its inner circumference.

14. The power drill as defined in claim 13, wherein the at least one recess has a ramp which is configured to convert a rotary movement of the adjusting element into an axial movement of the drive shaft.

15. The power drill as defined in claim 1, wherein the adjusting element has at least one projection which is configured to cooperate with at least one corresponding recess of the user-actuatable actuating element.

16. The power drill as defined in claim 1, wherein the adjusting element is mounted on a transmission housing.

17. The power drill as defined in claim 1, wherein a transmission housing has at least one undercut which is configured to cooperate with the adjusting element for axially securing the adjusting element on the transmission housing.

18. The power drill as recited in claim 17, wherein the actuating element cooperates with stops in the housing that limit a radial adjusting range of the actuating element, and by means of the coupling of the actuating element to the adjusting element, regions of the adjusting element without any second recesses are always situated at least partially in a region of the undercut.

19. The power drill as defined in claim 1, wherein a transmission housing has a plurality of threaded struts configured to rotatably mount the clutch-adjusting ring.

20. The power drill as defined in claim 19, wherein the adjusting element has a plurality of recesses which are configured to each accommodate one of a plurality of threaded struts on the transmission housing upon mounting of the adjusting element onto the transmission housing.

21. The power drill as defined in claim 1, wherein the adjusting element has a plurality of spacer elements which are situated at equidistant angular intervals and are embodied in one piece with the adjusting element.

22. The power drill as defined in claim 1, wherein the transmission element has at least one recess that cooperates the at least one spacer element of the adjusting element such that in the screwdriving position, the at least one spacer element engages in the at least one recess.

23. A power drill, having
a tool-clamping device that is coupled to a drive motor via a drive shaft;
a torque clutch comprising:
    a transmission element; and
    a clutch-adjusting ring that cooperates at least indirectly with at least one clamping element that exerts a prestressing force on the transmission element;
a drive shaft being guided in a bearing, the drive shaft being axially fixed in a drilling or screwdriving position and being axially released in an impact drilling position; and
a user-actuatable actuating element which is embodied in one piece with or coupled to an adjusting element,
wherein the adjusting element is configured to axially fix the transmission element and to axially release the drive shaft in the impact drilling position, and to axially release the transmission element and to axially fix the drive shaft in the drilling or screwdriving position,
    wherein the bearing cooperates with a bearing holder which moves the bearing axially via the user-actuatable actuating element,
    wherein the adjusting element has at least one spacer element on a side thereof oriented toward the transmission element, wherein, in the drilling or screwdriving position, the at least one spacer element is supported against an element affixed to a housing, thus holding the bearing holder in a position that locks the axial bearing of the drive shaft, and wherein, in the impact drilling position, the at least one spacer element does not contact the element affixed to the housing so that the bearing holder moves the axial bearing into a position that releases the drive shaft.

24. A power drill, having
a tool-clamping device that is coupled to a drive motor via a drive shaft;
a torque clutch comprising:
    a transmission element; and
    a clutch-adjusting ring that cooperates at least indirectly with at least one clamping element that exerts a prestressing force on the transmission element;
a drive shaft being guided in a bearing, the drive shaft being axially fixed in a drilling or screwdriving position and being axially released in an impact drilling position; and
a user-actuatable actuating element which is embodied in one piece with or coupled to an adjusting element,
wherein the adjusting element is configured to axially fix the transmission element and to axially release the drive shaft in the impact drilling position, and to axially release the transmission element and to axially fix the drive shaft in the drilling or screwdriving position,
wherein the adjusting element has at least one spacer element and the transmission element has at least one recess that cooperates with the at least one spacer element of the adjusting element such that in the screwdriving position, the at least one spacer element engages in the at least one recess.

25. A power drill, having
a tool-clamping device that is coupled to a drive motor via a drive shaft;
a torque clutch comprising:
    a transmission element; and
    a clutch-adjusting ring that cooperates at least indirectly with at least one clamping element that exerts a prestressing force on the transmission element;
a drive shaft being guided in a bearing, the drive shaft being axially fixed in a drilling or screwdriving position and being axially released in an impact drilling position; and
a user-actuatable actuating element which is embodied in one piece with or coupled to an adjusting element,
wherein the adjusting element is configured to axially fix the transmission element and to axially release the drive shaft in the impact drilling position, and to axially release the transmission element and to axially fix the drive shaft in the drilling or screwdriving position,
wherein the adjusting element has at least one axially projecting spacer element on a side thereof oriented toward the transmission element, the spacer element being directly supported against the transmission element such that in the impact drilling position, the spacer element acts as an axial locking element for the transmission element.

* * * * *